United States Patent
Hagai et al.

(10) Patent No.: US 7,262,882 B2
(45) Date of Patent: Aug. 28, 2007

(54) DISTRIBUTION CURVE GENERATING DEVICE

(75) Inventors: Naoki Hagai, Komaki (JP); Masashi Kuno, Ohbu (JP); Masaki Kondo, Toyoake (JP); Masashi Ueda, Nagoya (JP); Masahiro Nishihara, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1071 days.

(21) Appl. No.: 10/309,826

(22) Filed: Dec. 5, 2002

(65) Prior Publication Data

US 2003/0107763 A1 Jun. 12, 2003

(30) Foreign Application Priority Data

Dec. 7, 2001 (JP) ............................. 2001-373869

(51) Int. Cl.
*G06F 15/00* (2006.01)
*G06K 15/00* (2006.01)
*G06K 9/00* (2006.01)
*B41J 2/385* (2006.01)

(52) U.S. Cl. .................. 358/1.9; 358/3.1; 347/131; 347/188; 347/254; 382/100

(58) Field of Classification Search .............. 358/1.9, 358/518, 523, 502, 534, 3.1; 347/43, 131, 347/188, 254; 346/46; 382/100
See application file for complete search history.

(56) References Cited

U.S. PATENT DOCUMENTS 4,672,432 A 6/1987 Sakurada et al.
4,959,659 A 9/1990 Sasaki et al.
5,988,791 A 11/1999 Miyashita et al.
6,312,101 B1 11/2001 Couwenhoven et al.
6,331,042 B1 12/2001 Yamada

FOREIGN PATENT DOCUMENTS

| JP | A-5-38818 | 2/1993 |
| JP | A-11-314382 | 11/1999 |
| JP | A-2000-127460 | 5/2000 |
| JP | A-2001-47665 | 2/2001 |
| JP | A 2001-63147 | 3/2001 |
| JP | A-2001-145999 | 5/2001 |
| JP | A-2001-213009 | 8/2001 |

*Primary Examiner*—Kimberly Williams
*Assistant Examiner*—Charlotte M. Baker
(74) *Attorney, Agent, or Firm*—Oliff & Berridge, PLC

(57) ABSTRACT

A plurality of color signals indicative of a plurality of color patterns are processed based on a first distribution curve to distribute the original color signals into color signals for normal ink and color signals for light ink. Then, the plurality of color patterns are printed by the color signals for normal ink and color signals for light ink. Then, the density of each color pattern is detected to produce a density curve. A second distribution curve is produced based on the detected density, the original color signals, and the first distribution curve so that the second distribution curve can attain a properly linearly-changing density curve. By preparing beforehand a plurality of first distribution curves dependently on a variety of usage conditions of the printer, it is possible to use a second distribution curve that is in conformity to the usage condition, under which the printer is desired to be driven, by selecting a distribution curve that corresponds to the usage condition.

14 Claims, 16 Drawing Sheets

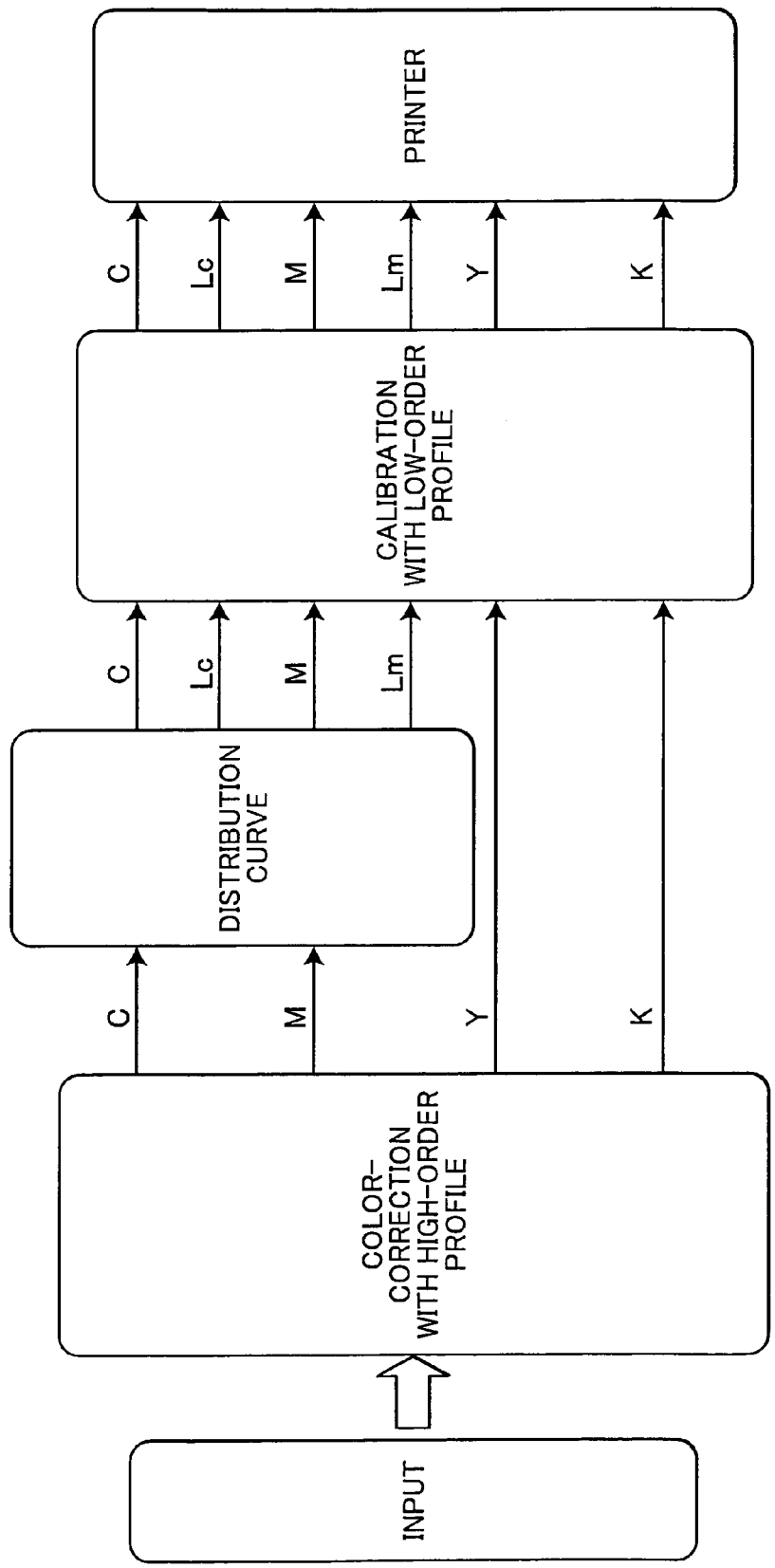

FIG.9

| GRADATION (i) | DENSITY VALUE Di | INPUT LEVEL | LIGHT INK OUTPUT LEVEL | NORMAL INK OUTPUT LEVEL |
|---|---|---|---|---|
| 0 | 0.1 | 0 | 0 | 0 |
| 1 | 0.1082 | 4 | 6 | 0 |
| 2 | 0.1164 | 5 | 9 | 0 |
| 3 | 0.1246 | 5 | 9 | 0 |
| ... | ... | ... | ... | ... |
| 10 | 0.182 | 17 | 34 | 0 |
| ... | ... | ... | ... | ... |
| 20 | 0.264 | 25 | 50 | 0 |
| ... | ... | ... | ... | ... |
| 30 | 0.346 | 37 | 74 | 0 |
| ... | ... | ... | ... | ... |
| 40 | 0.428 | 50 | 100 | 0 |
| ... | ... | ... | ... | ... |
| 50 | 0.51 | 70 | 140 | 0 |
| ... | ... | ... | ... | ... |
| 60 | 0.592 | 95 | 190 | 0 |
| ... | ... | ... | ... | ... |
| 70 | 0.674 | 145 | 225 | 35 |
| ... | ... | ... | ... | ... |
| 80 | 0.752 | 165 | 190 | 70 |
| ... | ... | ... | ... | ... |
| 252 | 2.0854 | 253 | 3 | 252 |
| 253 | 0.0936 | 255 | 0 | 255 |
| 254 | 2.1018 | 255 | 0 | 255 |
| 255 | 2.2 | 255 | 0 | 255 |

TABLE INDICATIVE OF CORRELATION BETWEEN
GRADATION – DENSITY – INPUT LEVEL – OUTPUTLEVELS FOR
LIGHT INK AND NORMAL INK

FIG.12

|  | DISTRIBUTION CURVE (1)' | DISTRIBUTION CURVE (2)' |
|---|---|---|
| INK DEPOSITION AMOUNT | LESS THAN 200% | 200% OR GREATER |
| MEDIA TYPE | MAT OR NORMAL PAPER | GLOSSY PAPER |
| INK TYPE | SLOW-DRYING | QUICK-DRYING |
| RESOLUTION | 600 dpi OR LESS | MORE THAN 600 dpi |
| PRINTING DIRECTION | BI-DIRECTIONAL PRINTING | SINGLE-DIRECTION PRINTING |

TABLE INDICATIVE OF
PRINTING CONDITION - DISTRIBUTION CURVE RELATIONSHIP

DISTRIBUTION CURVE GENERATING DEVICE

BACKGROUND OF THE INVENTION

1. Field of the Invention

The present invention relates to a distribution curve generating device for generating a distribution curve used by an image forming device for distributing a color signal of a predetermined color into a color signal of normal ink for the subject color and a color signal of light ink of the subject color, the light ink having density lighter than the normal ink.

2. Description of Related Art

In recent years, color printers of the type that eject multiple colors of ink from the print head, commonly known as inkjet printers, have become widely popularized as a computer output device. These inkjet printers are widely used to print images that have been processed by a computer or the like in multiple colors and in multiple gradations.

Generally these color printers form images based on image signals by outputting combinations of the four colors of ink: black (BK), cyan (C), magenta (M), and yellow (Y); or the six colors of ink; black (BK), cyan (C), magenta (M), yellow (Y), light cyan (Lc), and light magenta (Lm). When using the six colors of ink, often the processings are required to divide or distribute data for cyan into data of normal cyan and data of light cyan at a distribution ratio for cyan and to divide or distribute data for magenta into data for normal magenta and light magenta with another distribution ratio for magenta. A distribution curve is defined for each color (cyan and magenta) as indicative of the distribution ratio for the corresponding color. The distribution curve for each color determines distribution ratios of normal ink and light ink to be outputted from a color printer based on the input level of the corresponding color.

SUMMARY OF THE INVENTION

It is an objective of the present invention to provide an improved distribution curve generating device.

In order to attain the above and other objects, the present invention provides a distribution curve generating device for generating a distribution curve for an image forming device, comprising: a first distribution curve storing portion storing a plurality of first distribution curves, each being used for distributing an original color signal of a predetermined color into a color signal for normal ink of the predetermined color and a color signal for light ink of the predetermined color, the light ink having density lighter than the normal ink; a color signal inputting portion inputting a plurality of original color signals indicative of an image; a density data detecting portion processing the original color signals inputted by the color signal inputting portion based on at least one of the plurality of first distribution curves stored by the first distribution curve storing portion and detecting the density data of the image that is produced by an image forming device according to the processed original color signals; and a second distribution curve generating portion generating at least one second distribution curve based on: the at least one first distribution curve, the density data detected by the density data detecting portion, and the original color signals inputted by the color signal inputting portion.

The distribution curve generating device may further comprise a distribution curve selecting portion executing either one of a first distribution curve selecting operation to select one of the plurality of first distribution curves stored in the first distribution curve storing portion and a second distribution curve selecting operation to select one of the at least one second distribution curve generated by the second distribution curve generating portion.

According to another aspect, the present invention provides a program to be executed by a computer to generate a distribution curve for an image forming device, the computer including a first distribution curve storing portion storing a plurality of first distribution curves, each being used for distributing an original color signal of a predetermined color into a color signal for normal ink of the predetermined color and a color signal for light ink of the predetermined color, the light ink having density lighter than the normal ink, the program comprising: a color signal inputting program inputting a plurality of original color signals indicative of an image; a density data detecting program processing the original color signals inputted by the color signal inputting portion based on at least one of the plurality of first distribution curves stored by the first distribution curve storing portion and detecting the density data of the image that is produced by an image forming device according to the processed original color signals; and a second distribution curve generating program generating at least one second distribution curve based on: the at least one first distribution curve, the density data detected by the density data detecting program, and the original color signals inputted by the color signal inputting program.

BRIEF DESCRIPTION OF THE DRAWINGS

The above and other objects, features and advantages of the invention will become more apparent from reading the following description of the preferred embodiments taken in connection with the accompanying drawings in which:

FIG. 2 illustrates how color signals are processed by a personal computer before being supplied to a printer;

FIG. 9 shows a table created during the process of FIG. 5 to show the correlation between each gradation level, its corresponding density value, its corresponding input level, its corresponding light ink distribution level, and its corresponding normal ink distribution level;

FIG. 12 shows a table that lists up conditions to be preferably set in a printer for the distribution curves (1)' and (2)' that correspond to the distribution curves (1) and (2) of FIGS. 3(A) and 3(B);

DETAILED DESCRIPTION OF THE PREFERRED EMBODIMENTS

Figure 1:
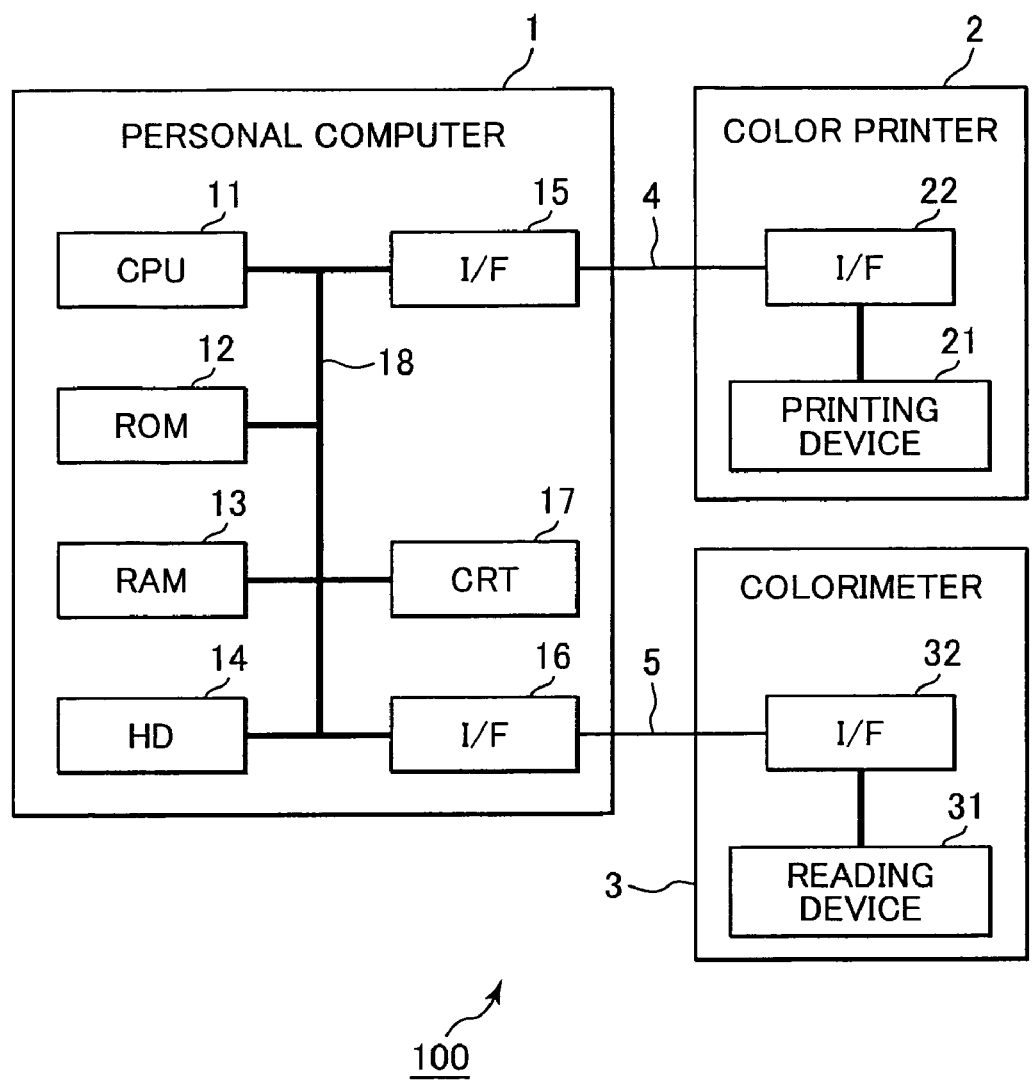
FIG. 1 is a block diagram showing the general construction of a distribution curve generating device according to a preferred embodiment of the present invention.

A distribution curve generating device according to preferred embodiments of the present invention will be described while referring to the accompanying drawings wherein like parts and components are designated by the same reference numerals to avoid duplicating description.

First Embodiment

FIG. 1 is a block diagram showing a distribution curve generating device 100 according to a first embodiment of the present invention.

As shown in FIG. 1, the distribution curve generating device 100 is constructed from a personal computer 1 and a colorimeter 3. A color printer 2 is connected to the personal computer 1. The personal computer 1, colorimeter 3, and color printer 2 perform data communications with one another through special interface cables 4 and 5.

The color printer 2 is provided with an inkjet printing device 21 and a personal computer interface 22. The inkjet printing device 21 performs data communications with the personal computer 1 via the personal computer interface 22 and a printer interface 15 (to be described later) in the personal computer 1.

The inkjet printing device 21 forms images on a recording medium by ejecting ink of the six types: cyan (C), magenta (M), yellow (Y), black (K), light cyan (Lc), and light magenta (Lm) based on input image data provided by the personal computer 1. It is noted that light cyan ink has a lighter color than the normal magenta ink and that light magenta ink has a lighter color than the normal magenta ink. The inkjet printing device 21 is configured to record multilevel color images having tones of 256 gradations.

In order to control the printer 2 to print desired images, the personal computer 1 executes color signal processing as shown in FIG. 2. That is, the personal computer 1 performs color correction onto input image data (color data for four colors of cyan (C), magenta (M), yellow (Y), black (X)) by using a high-order profile (to be described later). Then, the personal computer 1 distributes the color-corrected color data C into color data C for normal cyan and color data Lc for light cyan by using a distribution curve for cyan (to be described later), and distributes the color-corrected color data M into color data M for normal magenta and color data Lm for light magenta by using a distribution curve for magenta (to be described later). Next, the personal computer 1 executes calibration onto the color data C, Lc, M, Lm, Y, and K by using a low-order profile (to be described later). The personal computer 1 outputs the calibrated color data C, Lc, M, Lm, Y, and K to the printer 2, which in turn prints color images as a result.

The colorimeter 3 is provided with a reading device 31 and a personal computer interface 32. The reading device 31 performs data communications with the personal computer 1 via the personal computer interface 32 and colorimeter interface 16 (to be described later) in the personal computer 1.

The reading device 31 is for measuring the intensity of light reflected from or passed through a target object. The reading device 31 separates the color of the measured object into three primary colors, and outputs the density level of each primary color, which will be used as a calorimetric database.

The personal computer 1 includes a CPU 11, a ROM 12, a RAM 13, a hard disk 14, the printer interface 15, the colorimeter interface 16, and a display device (CRT) 17. The above components perform data communications among one another via a bus 18.

The printer interface 15 performs bi-directional data communications with the color printer 2 according to a specific communication protocol determined between the personal computer 1 and the color printer 2. The colorimeter interface 16 performs bi-directional data communications with the colorimeter 3 according to a specific communication protocol determined between the personal computer 1 and colorimeter 3.

The display device 17 displays various data types in a format that the user of the present system can view and confirm.

The CPU 11 executes various calculations and control processes for controlling other components according to various programs stored in the ROM 12 or various programs read from the hard disk 14 and stored in the RAM 13.

The RAM 13 is a storage device that can be arbitrarily read from or written to. The RAM 13 can store various programs read from the hard disk 14, as well as various data obtained through calculations by the CPU 11.

The hard disk 14 is an auxiliary storage device for storing, as files, such data types as programs and image data that are not regularly stored in the ROM 12 or REM 13 (main storage devices).

The hard disk 14 also stores: a profile generating program for executing a variety of profile generating processes; and a variety of profiles generated by the execution of the profile generating processes. The profiles include: a high-order profile, and a low-order profile.

The high-order profile is for executing color correction (FIG. 2). More specifically, the high-order profile is a data file used for correcting input image data (color data for four colors of cyan (C), magenta (M), yellow (Y), black (K)), taking into account color interaction, in order to produce an appropriate color. The high-order profile stores, for each of the four colors C, M, Y, K, one set of corrected color data in correspondence with each of a plurality of sets of color data that are arranged at regular gradation intervals between the minimum gradation level (0) and the maximum gradation level (255). Accordingly, when executing the color correction process onto arbitrary input color data that is not listed in the profile, an interpolation process is needed to interpolate several sets of color data in the profile that surround the subject input data to calculate a corrected color data (approximation).

The low-order profile is used for executing calibration to correct variations between individual printers, deterioration of the printer with age, and the like.

The ROM 12 stores a distribution curve generating program of the present embodiment (FIGS. 4 and 5), a program of color signal processing for printing (FIG. 11), other various programs, and other types of data that are not required to be overwritten. The ROM 12 further stores two kinds of first distribution curves (1) and (2) for each of cyan and magenta. Each first distribution curve (1), (2) is for distributing color signals for a corresponding color (color-corrected color data C (cyan) or M (magenta)) into color signals for normal ink of the same color (color data C (normal cyan) or M (normal magenta)) and color signals for light ink of the same color (color data Lc (light cyan) or Lm (light magenta)).

Figure 3A:
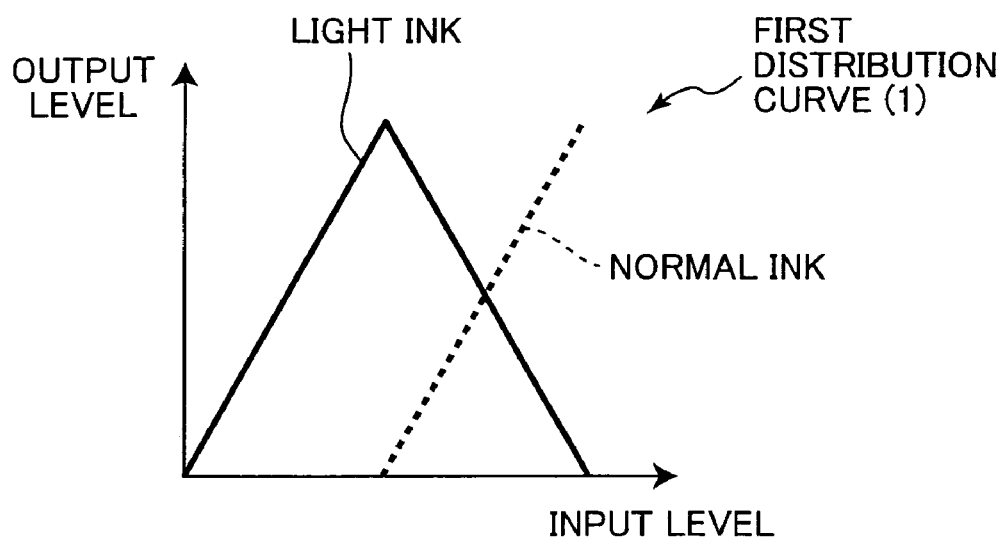
FIG. 3(A) is a graph showing a first distribution curve (1)
Figure 3B:
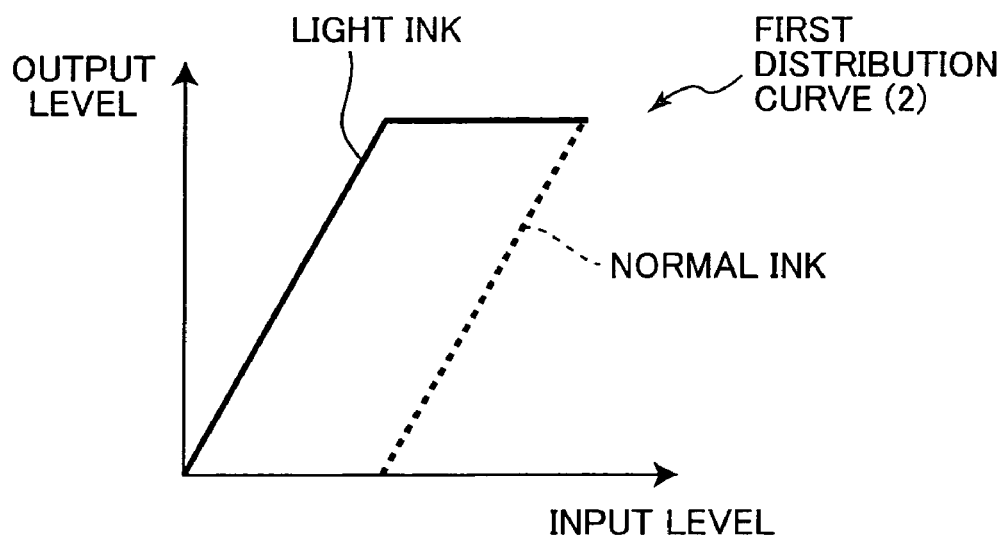
FIG. 3(B) is a graph showing a first distribution curve (2)

FIG. 3(A) shows the first distribution curve (1), and FIG. 3(B) shows the first distribution curve (2). In each first distribution curve (1), (2), as shown in FIGS. 3(A) and 3(B), the solid line represents the output level (color signals (vertical axis)) for light ink in relation to the input level (original color signals (horizontal axis)), while the dotted line represents the output level (color signals (vertical axis)) for normal ink in relation to the input level (original color signals (horizontal axis)). For example, the first distribution curve (1) for cyan has the solid line indicative of the output level (color signals for light cyan ink) in relation to the input level (original color signals for cyan) and the dotted line indicative of the output level (color signals for normal cyan) in relation to the input level (original color signals for cyan). The first distribution curve (1) for magenta has the solid line indicative of the output level (color signals for light magenta ink) in relation to the input level (original color signals for magenta) and the dotted line indicative of the output level (color signals for normal magenta) in relation to the input level (original color signals for magenta).

It is noted, however, that if the color signals (color data already corrected by the high-order profile) are distributed by the first distribution curve (1) or (2) and are supplied to the printer 2, there is a possibility that images outputted by the printer 2 will not attain a linearly-changing density curve in relation to the input level but that an inflection point in the density data will occur at some point in the input level. Especially when the density curve abruptly changes in relation to the input level at some point in the input level, there is a tendency for false contours to be generated in the output images. However, as will be described later, when a second distribution curve (1)' or (2)' is generated for each of cyan and magenta based on this first distribution curve (1) or (2) by execution of the distribution curve generating program (FIGS. 4 and 5) and when color signals (color-corrected color data C and M) for an input image are processed based on this second distribution curve (1)' or (2)', by supplying the processed color signals to the color printer 2, it is possible to produce output images that attain a linear density curve with no inflection point relative to the input levels and that have no false contours.

More specifically, the first distribution curve (1) shown in FIG. 3(A) sets the distribution ratio of the light ink to zero (0) when the density represented by the combination of normal ink and light ink reaches the maximum. As will be described later, when a second distribution curve (1)' is generated for each of cyan and magenta based on this first distribution curve (1) by execution of the distribution curve generating program (FIGS. 4 and 5), color signals (color-corrected color data C and M) for an input image will be processed based on this second distribution curve (1)'. When supplying the processed color signals to the color printer 2, it is possible not only to produce output images that attains a linear density curve relative to the input levels, but also to reduce the total amount of ink used, even when reproducing maximum density data, thereby preventing the blotting of ink.

The first distribution curve (2) shown in FIG. 3(B) indicates that the total combination of normal ink and light ink increases uniformly as values of the inputted color signals increase. As will be described later, when a second distribution curve (2)' is generated for each of cyan and magenta based on this first distribution curve (2) by execution of the distribution curve generating program (FIGS. 4, 5), color signals (color-corrected color data C and M) for an input image will be processed based on this second distribution curve (2)'. When supplying the processed color signals to the color printer 2, it is possible to produce output images that not only attain a linear density curve relative to the input levels but also have superior gradation characteristics because there are no inflection points in the characteristics of total ink volume in relation to the values of the inputted color signals, enabling the formation of images without false contours.

With the above-described configuration, the distribution curve generating device generates a second distribution curve (1)' or (2)' based on a first distribution curve (1) or (2).

Figure 4:
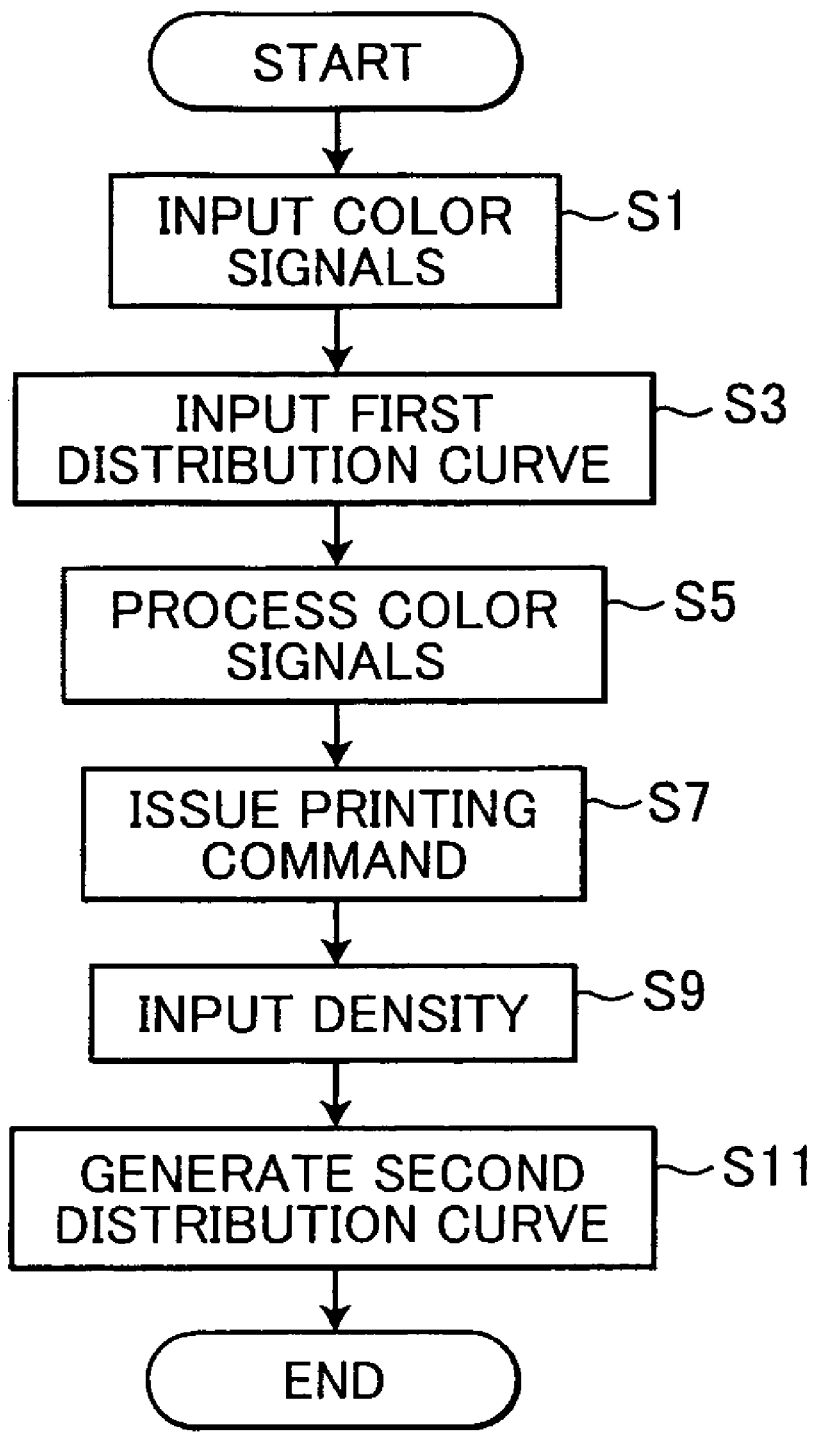
FIG. 4 is a flowchart illustrating the distribution curve generating process according to a first embodiment.

In order to generate a second distribution curve (1)' or (2)' based on a first distribution curve (1) or (2), the personal computer 1 executes the distribution curve generating program as shown in FIG. 4.

Figure 6:
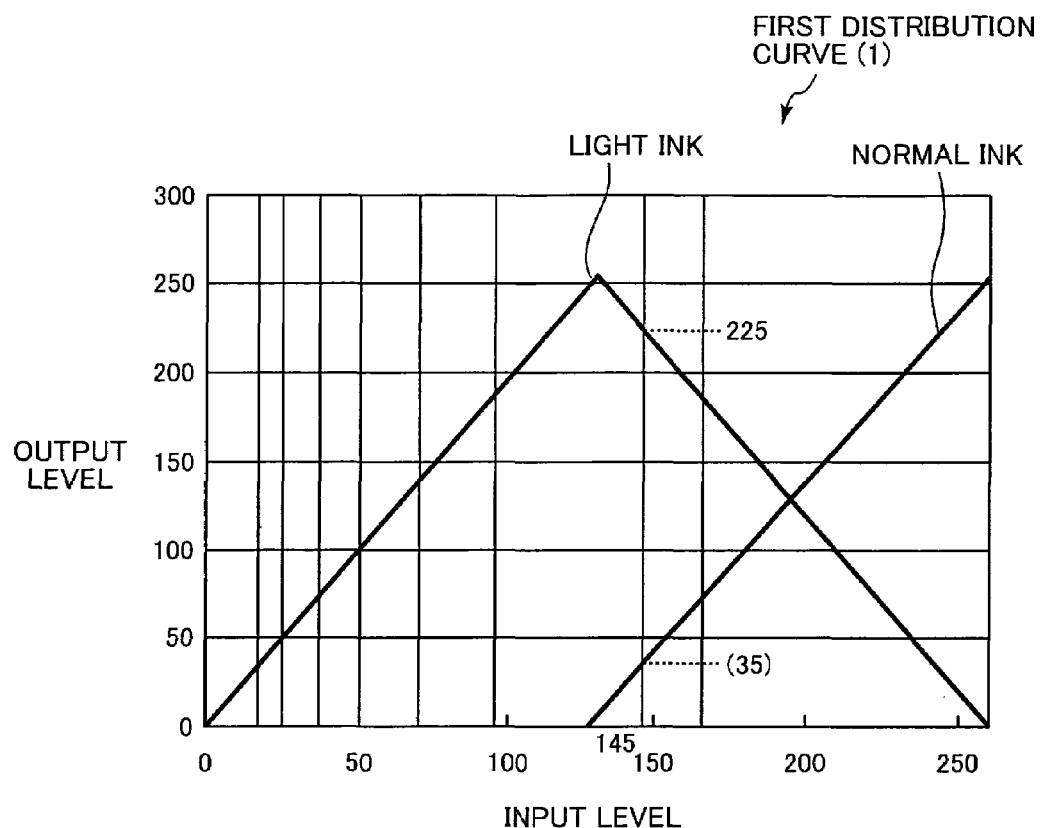
FIG. 6 is a graph showing an example of a first distribution curve (1) used during the process of FIG. 4.

The following description is given for the case where a second distribution curve (1)' for cyan is produced based on a first distribution curve (1) for cyan as shown in FIG. 6.

It is noted, however, that a second distribution curve (1)' for magenta, and second distribution curves (2)' for cyan and magenta can be produced based on the first distribution curve (1) for cyan and the first distribution curves (2) for cyan and magenta in the same manner as the second distribution curve (1)' for cyan.

Figure 7:
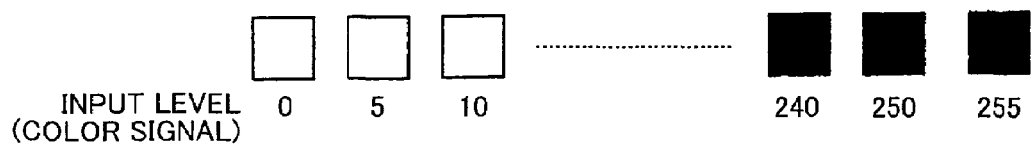
FIG. 7 is an explanatory diagram showing color signals (color patch data) used during the process of FIG. 4.

First, in S1, a plurality of (52, in this example) color signals are retrieved from the hard disk 14. The 52 color signals have valves of 0, 5, 10, . . . , 255 that are indicative of 52 color patches for 5-level increments at input levels from 0 to 255 as shown in FIG. 7.

Next, in S3, the first distribution curve (1) for cyan is retrieved from the ROM 12.

In S5, a color signal processing is performed on the 52 color signals based on the high-order profile and based on the first distribution curve (1) for cyan to generate a plurality of color signals Lc and C for light cyan ink and normal cyan ink. The plurality of color signals Lc and C are further calibrated by the low-order profile.

In S7, the personal computer 1 issues a printing command to the color printer 2 via the printer interface 15 to print 52 color patches by the processed color signals Lc and C.

After the color printer 2 outputs the color patches as shown in FIG. 7, the personal computer 1 controls in S9 the colorimeter 3 to measure density data of each color patch and to supply the density data (colorimetric data) to the personal computer 1. The personal computer 1 plots the value of density data for the value of each original color signal (0, 5, 10, . . . , 255) to create a density graph shown in FIG. 8(A). The density graph has a horizontal axis indicative of the value of the original color signal, and has a vertical axis indicative of the value of the density data.

Figure 8A:
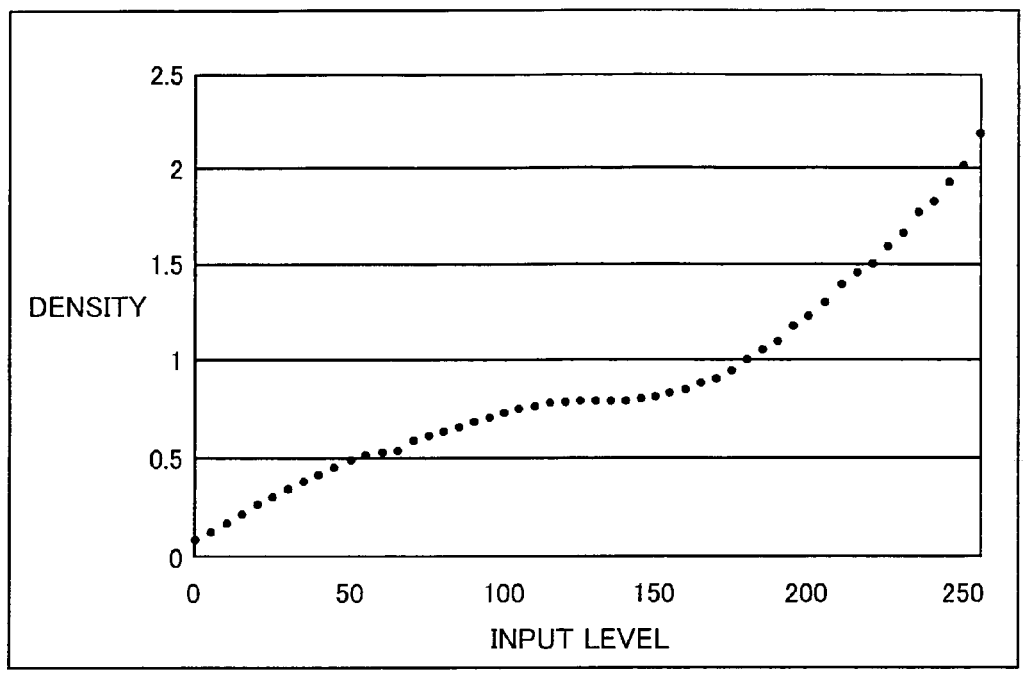
FIG. 8(A) is a graph showing how to plot density data relative to the color data during the process of FIG. 4.

In S11, the personal computer 1 generates a second distribution curve (1)' for cyan based on: the measured density data and the inputted color signals of 0, 5, 10, ..., 255, which appear in the density graph of FIG. 8(A); and the first distribution curve (1) for cyan.

The second-distribution curve generating step of S11 is for producing a second distribution curve that can produce an appropriately linearly-changing density curve that is obtained by correcting the density curve of FIG. 8(A) to change linearly. More specifically, the S11 is a process for correcting density linearity by interpolating density data to produce a density curve and by rearranging the density data in the density curve to create a second distribution curve.

Figure 5:
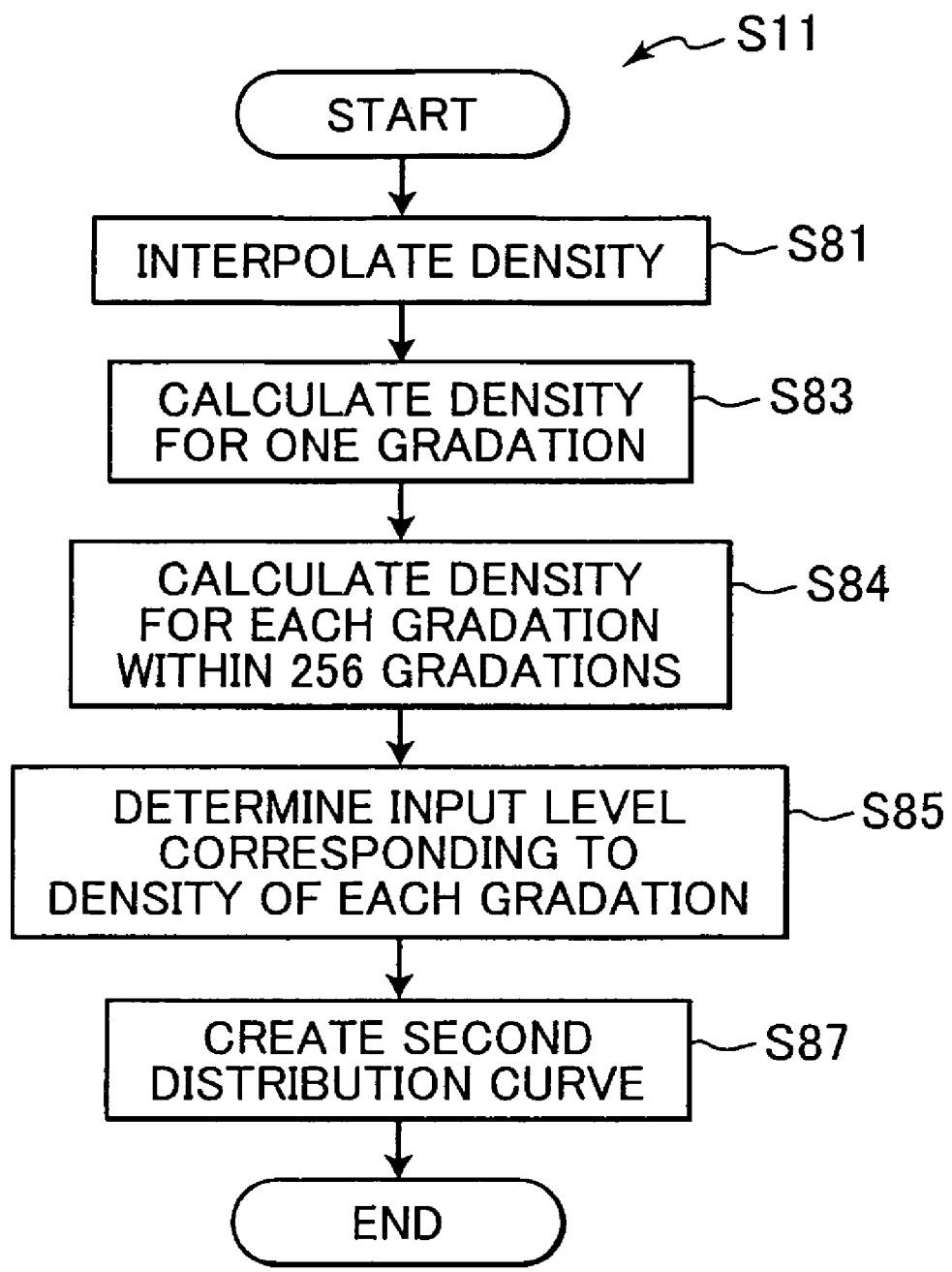
FIG. 5 is a flowchart illustrating a second distribution curve generating step in the process of FIG. 4.

Next, the second distribution curve generating step of S11 will be described in more detail while referring to FIG. 5.

Figure 8B:
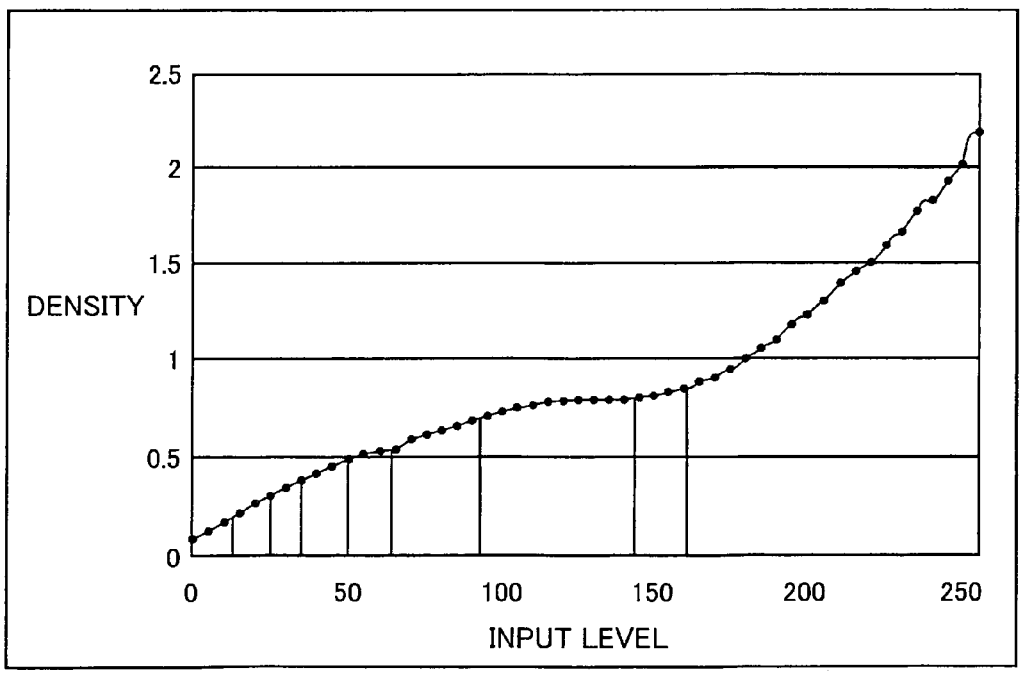
FIG. 8(B) is a graph showing a density curve produced by interpolating the density data in the graph of FIG. 8(A) during the process of FIG. 5.

First, in S81, the density data is interpolated. Since the color patch data of 0, 5, 10, ..., 255 are provided in increments of five from 0 to 255, density data for input levels of 2-4, 6-10, ..., 251-254, at which no density data exists, is determined by interpolating the density data acquired for the color patch data of 0, 5, 10, ..., 255. As a result, a density graph shown in FIG. 8(B) is generated.

In S83, one gradation step's worth of density value is determined in a manner described below. As shown in FIG. 8(B), the minimum density data (density data for color data 0) is 0.1 and the maximum density data (density data for color data 255) is 2.2. Accordingly, one gradation step's worth of density is calculated as 0.0082 by dividing the density data within the range of 0.1 and 2.2 by 256 levels for 0-255.

In S84, density data Di for any arbitrary gradation level i ($0 \leq i \leq 255$) is calculated according to the following equation:

$$Di = 0.0082 * i + 0.1,$$

wherein 0.0082 is density for one gradation step, i is a gradation level in the 256 gradations of 0 to 255, and 0.1 is the minimum density value. As a result, the personal computer 1 creates the first and second columns of a table shown in FIG. 9 to indicate relationship between the gradation levels (i) of 0, 1, 2, ..., 255 and the density values Di of 0.1, 0.1082, 0.1164, ..., 2.2.

In S85, while referring to the graph of FIG. 8(B), the personal computer 1 determines the input level (the amount of color data in the horizontal axis of FIG. 8(B)) that corresponds to the density data Di of each gradation level i of 0 to 255. It is noted that the plurality of vertical lines appearing in FIG. 8(B) show the plurality of input levels 17, 25, 37, 50, 70, 95, 145, 165, ... that correspond to density data D(10)(=0.182), D(20)(=0.264), D(30)(=0.346), D(40)(=0.428), D(50)(=0.51), D(60)(=0.592), D(70)(=0.674), D(80)(=0.752), ... for gradation levels i of 10, 20, 30, 40, 50, 60, 70, 80, .... As a result, the personal computer 1 creates the third column of the table of FIG. 9 to show the relationship between the density values Di of 0.1, 0.1082, 0.1164, ..., 0.182, ..., 0.264, ..., 0.346, ..., 0.428, ..., 0.51, ..., 0.592, ..., 0.674, ..., 0.752, ..., 2.2 and the color data of 0, 4, 5, ..., 17, ..., 25, ..., 37, ..., 50, ..., 70, ..., 95, ..., 145, ..., 165 ..., 255.

In S87, by referring to the first distribution curve of FIG. 6, the output levels 0, 6, 9, ..., 34, ..., 50, ..., 74, ..., 100, ..., 140, ..., 190, ..., 225, ..., 190, ..., 0 of the light ink curve for the input levels 0, 4, 5, ..., 17, ..., 25 ..., 37, ..., 50, ..., 70, ..., 95, ..., 145, ..., 165, ..., 255 in the third column of FIG. 9 are determined and listed in the fourth column of FIG. 9. The output levels 0, 0, 0, ..., 0, ..., 0, ..., 0, ..., 0, ..., 0, ..., 0, ..., 35, ..., 70, ..., 255 of the normal ink curve for the input levels 0, 4, 5, 17, ..., 25, ..., 37 ..., 50, ..., 70, ..., 95, ..., 145, ..., 165, ..., 255 in the third column of FIG. 9 are determined and listed in the fifth column of FIG. 9.

Figure 10:
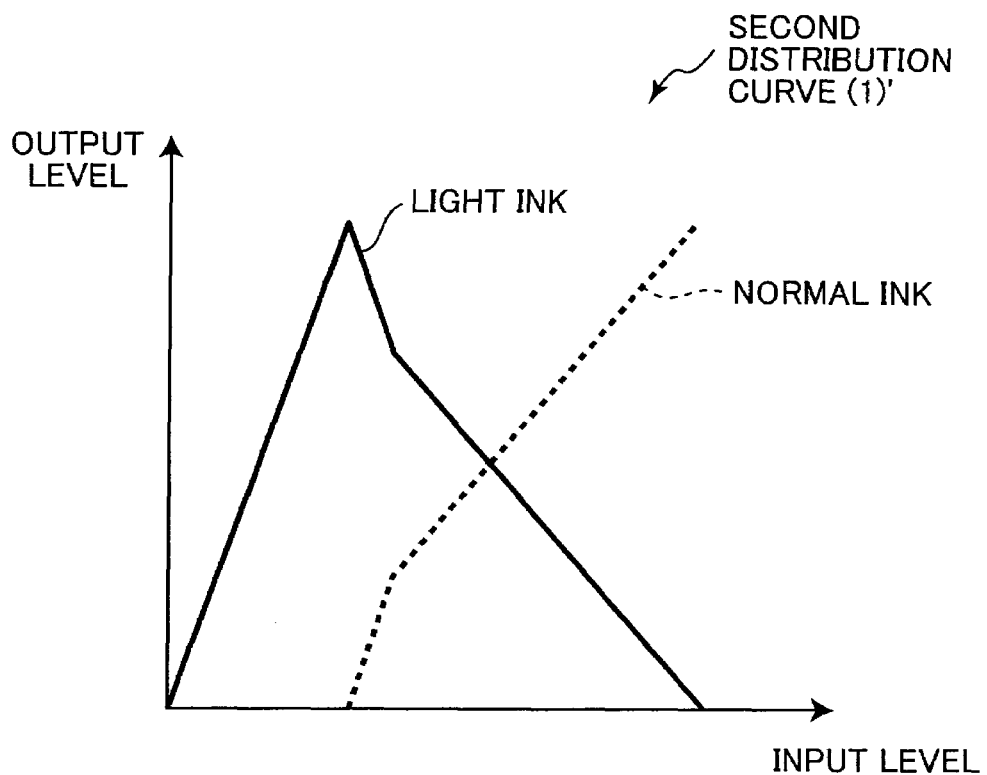
FIG. 10 is a graph showing an example of a second distribution curve produced by the process of FIG. 5.

Then, as shown in FIG. 10, by plotting the output levels 0, 6, 9, ..., 34, ..., 50, ..., 74, ..., 100, ..., 140, ..., 190, ..., 225, ..., 190, ..., 0 (fourth column of FIG. 9) along the vertical axis relative to the gradations (i) of 0, 1, 2, ..., 10, ..., 20, ..., 30, ..., 40, ..., 50, ..., 60, ..., 70, ..., 80, ..., 255 (first column of FIG. 9) along the horizontal axis, a light ink curve for the second distribution curve (1)' is generated. By plotting the output levels 0, 0, 0, ..., 0, ..., 0, ..., 0, ..., 0, ..., 0, ..., 0, ..., 35, ..., 70, ..., 255 (fifth column of FIG. 9) along the vertical axis relative to the gradations (i) of 0, 1, 2, ..., 10, ..., 20, ..., 30, ..., 40, ..., 50, ..., 60, ..., 70, ..., 80, ..., 255 (first column) along the horizontal axis, a normal ink curve for the second distribution curve (1)' is generated.

Thus, the second distribution curve (1)' is generated as shown in FIG. 10 and stored in the hard disk 14. Then, the second distribution curve generating process of S11 (FIG. 4) is ended.

Figure 11:
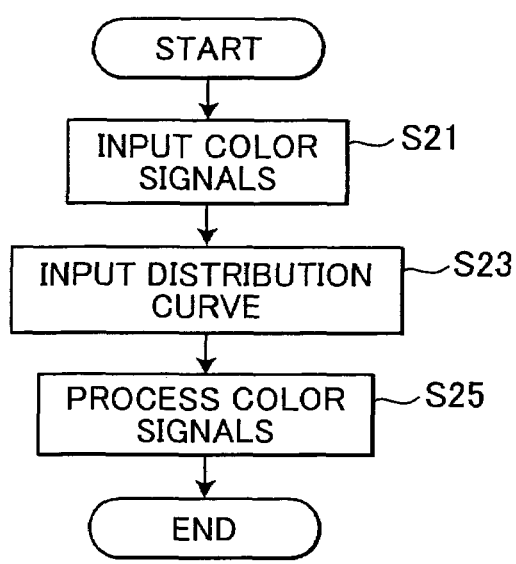
FIG. 11 is a flowchart showing the steps for processing color signals for printing.

After the second distribution curve (1)' is thus generated and stored, the personal computer 1 starts executing a color signal process as shown in FIG. 11 to print desired images.

First, in S21, color signals C, M, Y, K for the desired image are retrieved from the hard disk 14.

In S23, distribution curves desired to be used for cyan and magenta are retrieved from the memory section. When a first distribution curve (1) or (2) is desired to be used, the first distribution curve (1) or (2) is retrieved from the ROM 12. When a second distribution curve (1)' or (2)' is desired to be used, the second distribution curve (1)' or (2)' is retrieved from the hard disk 14.

In S25, a color signal process is performed on the color signals C, M, Y, K based on the high-order profile, the retrieved distribution curve, and the low-order profile. By supplying a print command and the processed color signals to the color printer 2, the color printer 2 prints the desired image.

When the second distribution curve (1)' or (2)' is used in S25, it is possible to attain a linear density variation in relation to the input level and prevent false contours.

Additionally, according to the present embodiment, because the two first distribution curves (1) and (2) are stored in the ROM 12, an appropriate second distribution curve (1)' or (2)' can be generated in accordance with the usage conditions of the color printer 2.

For example, the first distribution curve (1) shown in FIG. 3(A) sets the distribution ratio of light ink to zero (0) in correspondence with the maximum value (255) of input color data. Accordingly, by generating a second distribution curve (1)' based on this first distribution curve (1) and by using the second distribution curve (1)' during the printing process of FIG. 11, it is possible to reduce the total amount of ink, thereby preventing ink blotting even for maximum density. Hence, this second distribution curve (1)' is effective in such types of media that can be deposited with a relatively small amount of ink.

On the other hand, the first distribution curve (2) shown in FIG. 3(B) shows a uniform increase in total ink volume of normal ink and light ink as the values of input color signals increase. Accordingly, by generating a second distribution curve (2)' based on this first distribution curve (2) and by using the second distribution curve (2)' during the printing process of FIG. 11, it is possible to output images with superior gradation characteristics by ensuring that no inflection points occur in the total ink volume properties in relation to the values of input color signals. Therefore, it is possible to output images without false contours, which is effective especially for glossy paper. Accordingly, by selecting in S3 (FIG. 4) one of the first distribution curves (1) and (2) that conforms to the usage condition, under which the printer 2 is to be driven, it is possible to create a second distribution curve (1)' or (2)' that conforms to the usage condition of the printer 2.

FIG. 12 shows a table that lists up the preferable conditions to be set in the printer 2 when using the second distribution curves (1)' and (2)'.

As apparent from FIG. 12, using the second distribution curve (1)' will produce a better image quality than using the second distribution curve (2)' when the ink deposition amount is less than 200%, when using a mat-type paper or normal-type paper media, when using a slow-drying ink, when the resolution of the output image is 600 dpi or less, or when printing in both directions. Using the second distribution curve (2)' will secure better image quality than using the second distribution curve (1)' when the ink deposition amount is 200% or greater, when using a glossy-type paper media, when using a fast-drying ink, when the resolution of the output image is greater than 600 dpi, or when printing in a single direction.

<Modification>

Figure 13:
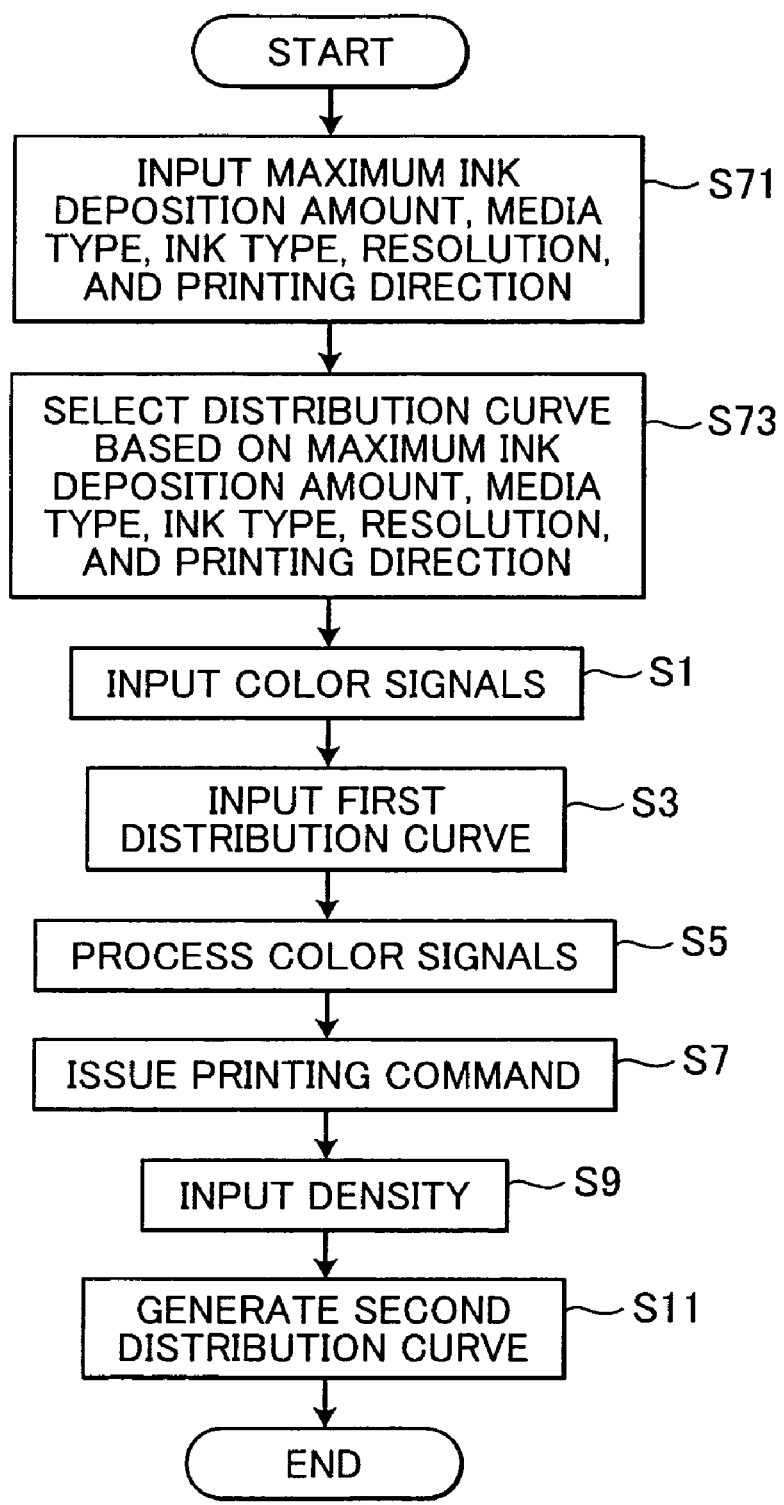
FIG. 13 is a flowchart illustrating the distribution curve generating process according to a modification of the first embodiment.

Considering the above-described characteristics of the second distribution curves (1)' and (2)', the distribution curve generating process of FIG. 4 may be modified as shown in FIG. 13.

It is noted that data of FIG. 12 is stored in the hard disk 14.

The distribution curve generating process of FIG. 13 is the same as that of FIG. 4 except that the processes of S71 and S73 are executed to select one of the first distribution curves (1) and (2) before starting the process of S1 and that the selected first distribution curve (1) or (2) is retrieved from the ROM 12 in S3 to generate a corresponding second distribution curve (1)' or (2)'.

In S71, a user manipulates an input device, such as a keyboard (not shown), to input a printing condition, under which the printer 2 is desired to be driven to print his/her desired image. The printing condition is defined according to at least one of several parameters that include: the maximum ink deposition amount, media type, ink type, printing resolution, and printing direction. It is noted that the maximum ink deposition amount is the maximum amount of ink that can be deposited on a recording medium used in the printer 2.

In S73, the personal computer 1 selects one of the first distribution curves (1) and (2) according to the inputted printing condition while referring to the table of FIG. 12. Thereafter, the process of S1-S11 will be executed by using the selected first distribution curve (1) or (2). When the corresponding second distribution curve (1)' or (2)' is produced in S11, the distribution curve generating process is ended.

The step of S73 will be described below in greater detail.

For example, when the user inputs the maximum ink deposition amount of 100% as the printing condition in S71, the personal computer 1 selects in S73 the first distribution curve (1) while referring to the table of FIG. 12. A second distribution curve (1)' will be generated during the process of S1-S11 based on the selected first distribution curve (1). Accordingly, it is possible to generate an appropriate second distribution curve (1)' according to the media type to be used in the printer 2.

When the user inputs the single-direction printing as the printing condition in S71 the personal computer 1 selects in S73 the first distribution curve (2) while referring to the table of FIG. 12. A second distribution curve (2)' will be generated during the process of S1-S11 based on the selected first distribution curve (2). Accordingly, it is possible to generate an appropriate second distribution curve (2)' according to the printing direction used in the printer 2.

It is noted that in S71, the user can input data of two or more parameters among the parameters of the maximum ink deposition amount, media type, ink type, printing resolution, and printing direction. In such a case, the personal computer 1 can select one of the first distribution curves (1) and (2) by giving priority to the parameters of the maximum ink deposition amount, media type, ink type, printing resolution, and printing direction. For example, it is now assumed that priority is given to the parameters of the maximum ink deposition amount, media type, ink type, printing resolution, and printing direction in this order. If the user inputs 100% of maximum ink deposition amount and glossy paper for media type, the personal computer selects the first distribution curve (1).

Or, the personal computer 1 can select one of the first distribution curves (1) and (2) that is appropriate for more than a half of the user's inputted several different printing conditions. For example, if the user inputs 100% of maximum ink deposition amount, glossy paper for media type, and slow-drying as ink type, the personal computer selects the first distribution curve (1).

After the second distribution curve (1)' or (2)' is produced in the distribution curve generating process of FIG. 13 for the selected first distribution curve (1)' or (2)', the printing process of FIG. 11 will be executed by using the produced second distribution curve (1)' or (2)'. That is, the second distribution curve (1)' or (2)' will be retrieved in S23 and will be used in S25. The color signals processed in S25 according to the second distribution curve (1)' or (2)' will be subjected to the printing operation by the printer 2 under the printing condition that conforms to that designated in S71 of FIG. 13.

The second distribution curve (1)' or (2)' used in S25 has been generated to be appropriate to the printing conditions. Accordingly, it is possible to attain not only a linear density variation in relation to the input level and prevent false contours but also to attain good printing performance in conformity with the usage conditions of the printer 2.

As described above, according to the present embodiment and modification, a plurality of color signals indicative of a plurality of color patterns are processed based on a first distribution curve to distribute the original color signals into color signals for normal ink and color signals for light ink. Then, the plurality of color patterns are printed by the color signals for normal ink and color signals for light ink. Then, the density of each color pattern is detected to produce a density curve. A second distribution curve is produced based on the detected density, the original color signals, and the first distribution curve so that the second distribution curve can attain a properly linearly-changing density curve. Accordingly, it is possible to generate a second distribution curve that can attain a linear density variation in relation to the input level. No inflection point will occur in the density variation relative to the input level. Because the second distribution curve does not abruptly change in response to the input level, it is possible to prevent false contours from being generated.

Additionally, the plurality of first distribution curves are prepared beforehand dependently on a variety of usage conditions of the printer 2. It is possible to use a second distribution curve that is in conformity to the usage condition, under which the printer is desired to be driven, by selecting a first distribution curve that corresponds to the usage condition and then generating a second distribution curve based on the selected first distribution curve.

It is noted that S71 and S73 may be executed after executing S1-S11 for all the first distribution curves (1) and (2) to generate all the second distribution curves (1)' and (2)'. In such a case, in S71 and S73, one of the second distribution curves (1)' and (2)' is selected according to the usage condition.

Second Embodiment

Next, a second embodiment of the present invention will be described with reference to FIG. 14 to FIG. 16.

Figure 14:
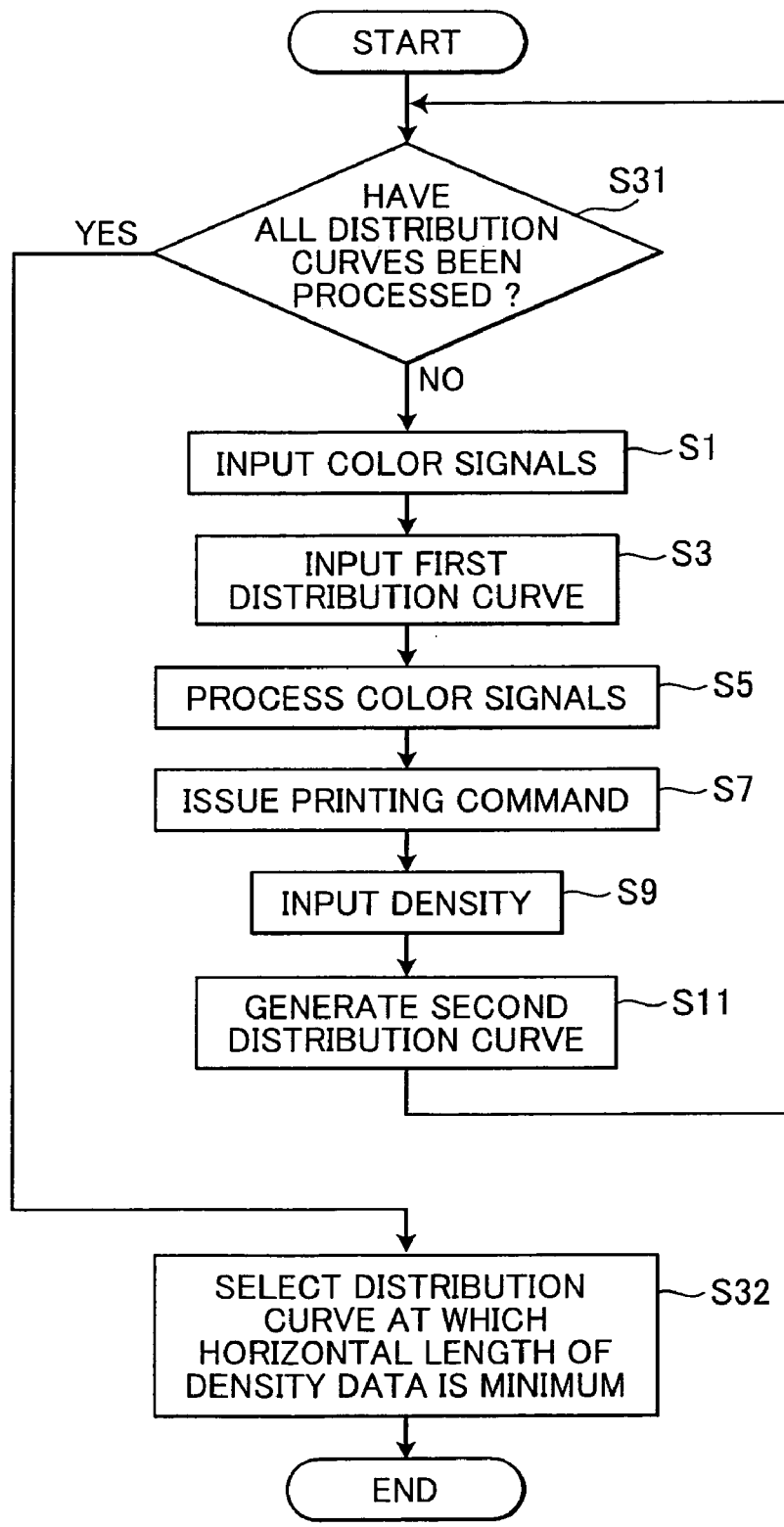
FIG. 14 is a flowchart illustrating a distribution curve generating process according to a second embodiment.

As shown in FIG. 14, the distribution curve generating process of the present embodiment is the same as that of the first embodiment (FIG. 4 and FIG. 5) except that steps S31 and S32 are added to the steps S1-S11 in the distribution curve generating process of the first embodiment.

It is judged in S31 whether the process of S1-S11 has been completed for all the first distribution curves (1) and (2) stored in the ROM 12. When the process has not yet been completed for all the first distribution curves (1) and (2) (No in S31), the process of S1-S11 is executed for the any first distribution curve (1) or (2) that has not yet processed.

On the other hand, when the process has been completed for all the first distribution curves (1) and (2) and all the second distribution curves (1)' and (2)' are produced (yes in S31), the process proceeds to S32.

Figure 15A:
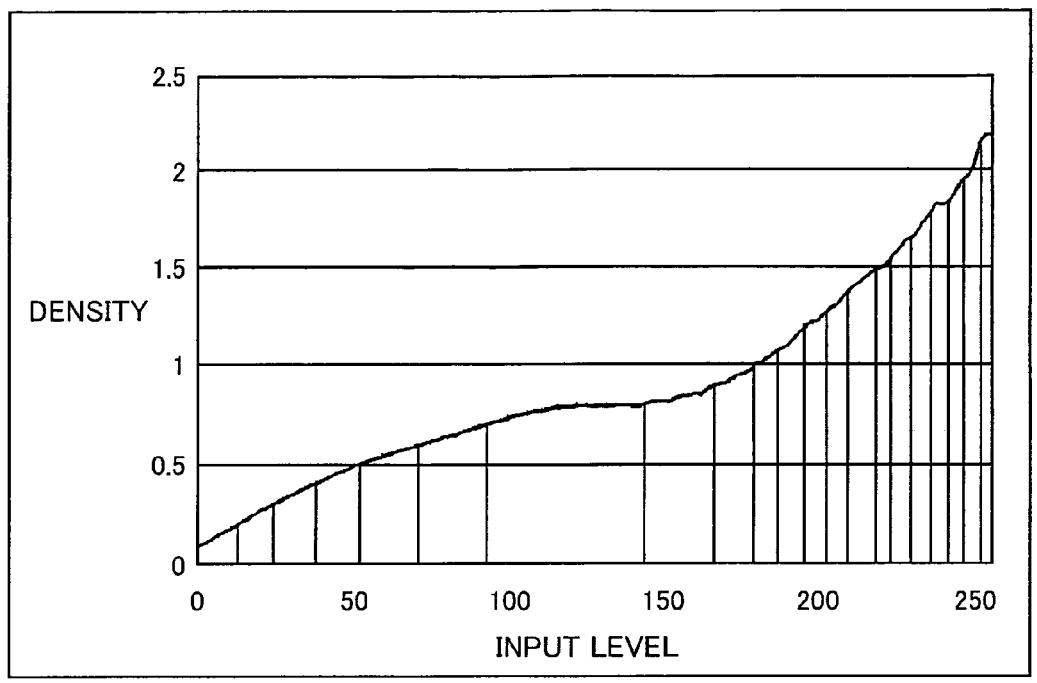
FIG. 15(A) is a graph showing an example of a density curve produced during the process of FIG. 14.

It is assumed that a density graph shown in FIG. 15(A) is generated for the first distribution curve (1) during the step S81 (FIG. 5) in Step S11. The plurality of vertical lines shown in FIG. 15(A) indicate the input levels of 0, 17, 25, 37, 50, 70, 95, 145, 165, . . . (horizontal axis) that correspond to the density data of 0.1, 0.2, 0.3, . . . on the density curve (vertical axis) at increments of 0.1. It is also assumed that another density graph (not shown) similar to that of FIG. 15(A) is generated for the first distribution curve (2).

In S32, one of the second distribution curves (1)' and (2)' is selected in a manner described below.

First, the density graph generated for each of the first distribution curve (1) and (2) is detected, to search leveled areas in the density curve. For example, in the density graph for the first distribution curve (1), as shown in FIG. 15(A), the density data (vertical axis) changes according to the change in the color signals (horizontal axis), but does not change at some regions of the color signals. More specifically, when change in density data is less than or equal to a prescribed value (0.1 in this example), it is determined that the variation of density data is approximately zero (0) and that the density data is leveled. Because the plurality of vertical lines in FIG. 15(A) indicate that the input levels of 0, 17, 25, 37, 50, 70, 95, 145, 165, . . . (horizontal axis) correspond to the plurality of density data in increments of 0.1, the regions between the vertical lines are determined as leveled areas where the variation of density data continues approximately zero (0) relative to the change in the color signals. Accordingly, a plurality of leveled areas, that is, areas from 0 to 17, from 17 to 25, from 25 to 37, . . . of the color signals (horizontal axis) are determined for the graph of FIG. 15(A).

Figure 15B:
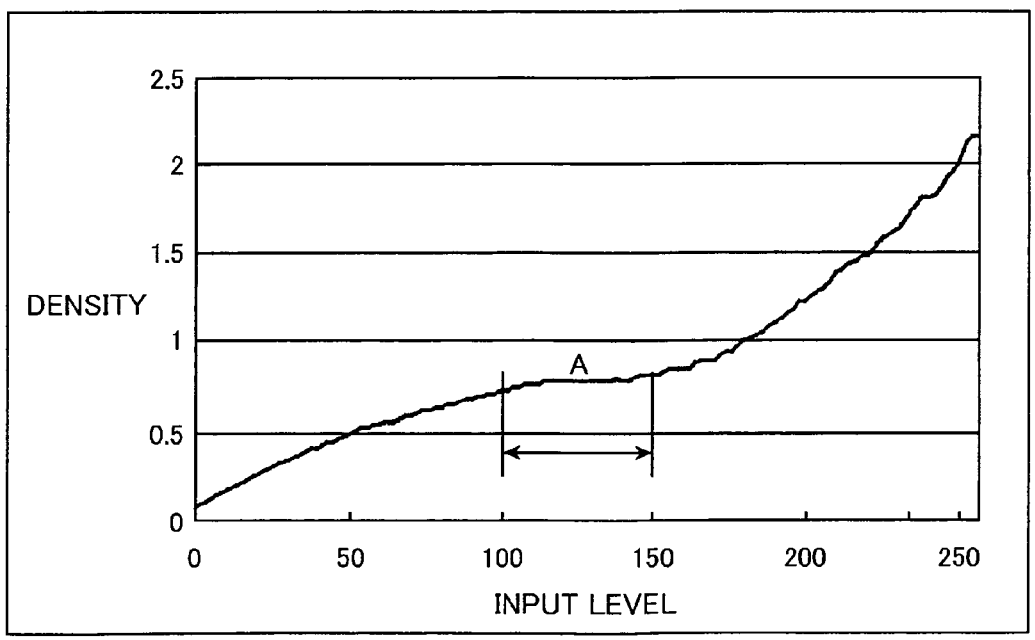
FIG. 15(B) is a graph illustrating a horizontal length of the density curve of FIG. 15(A)

Then, the longest leveled area is selected among the plurality of leveled areas. In this example, as shown in FIGS. 15(A) and 15(B), the area A between 95 and 145 of the color signals is determined as the longest leveled area in the density curve. Next, a horizontal length of the region A (50=145−95, in this example) is determined as a length of the longest leveled area of the density curve for the first distribution curve (1). The thus determined length of the longest leveled area is defined as a horizontal length of the density curve for the first distribution curve (1).

The horizontal length of the density curve obtained by the first distribution curve (2) is determined in the same manner as described above.

Then, the horizontal lengths of the density curves for the first distribution curves (1) and (2) are compared with each other. If the horizontal length for the first distribution curve (1) is smaller than that for the first distribution curve (2), the first distribution curve (1) is selected, and therefore the corresponding second distribution curve (1)' is selected. On the other hand, if the horizontal length for the first distribution curve (2) is smaller than that for the first distribution curve (1), the first distribution curve (2) is selected, and therefore the corresponding second distribution curve (2)' is selected. In this way, one of the second distribution curves (1)' and (2)' whose corresponding first distribution curve has resulted in the minimum horizontal length is selected.

When one of the second distribution curves (1)' and (2)' is selected in S32 in this manner, the distribution curve generating process of FIG. 14 is ended, and the printing process of FIG. 11 will be executed by using the selected second distribution curve (1)' or (2)'. That is, the selected second distribution curve (1)' or (2)' will be retrieved in S23 and will be used in S25.

According to the second embodiment, the second distribution curve (1)' or (2)', whose corresponding first distribution curve has generated the horizontal length (density-not-varying longest length) of a minimum value, is selected and used. Accordingly, when outputting an image on the color printer 2 using this second distribution curve, it is possible to improve the gradation characteristics of the image and prevent false contours, <Modification>

Figure 16:
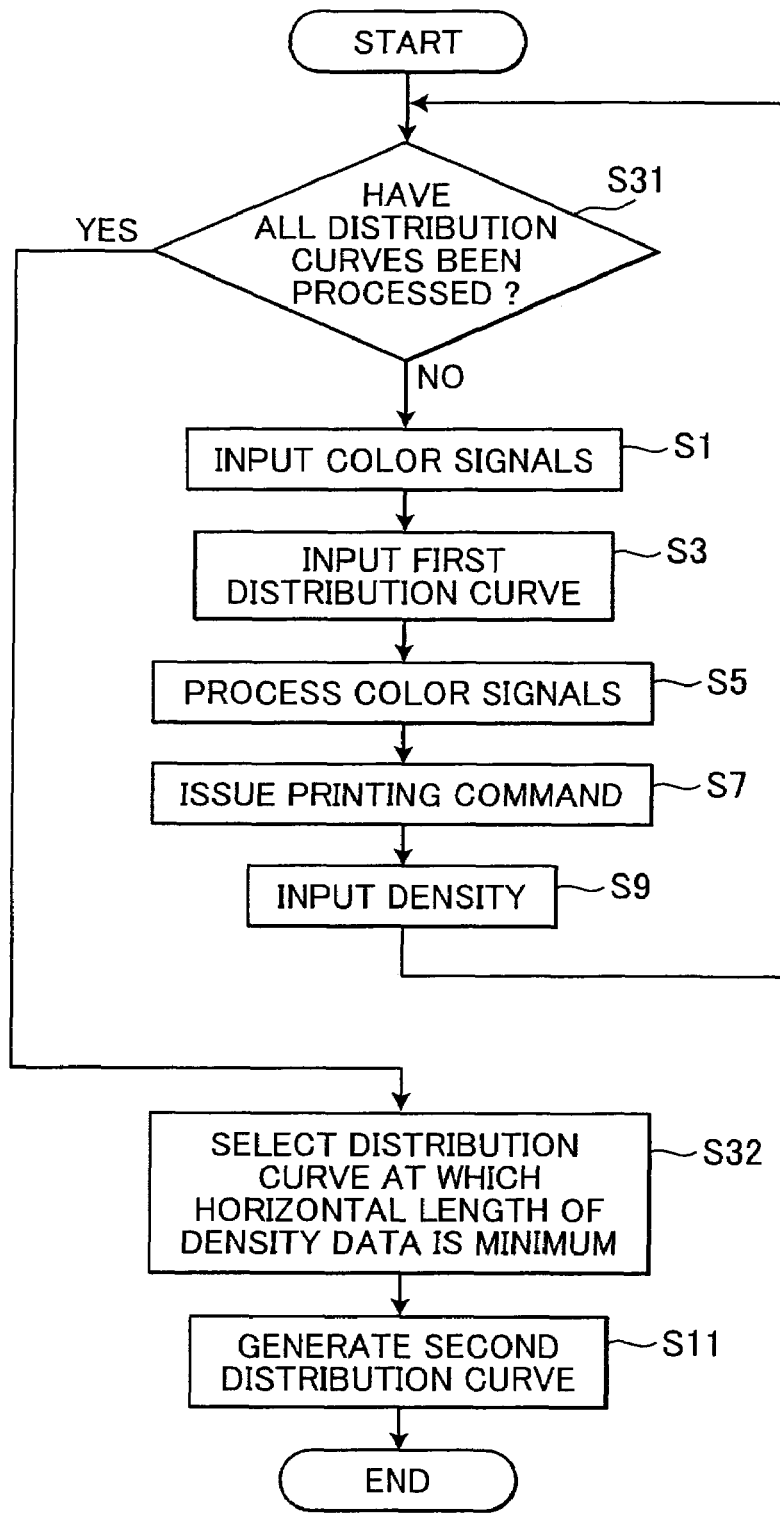
FIG. 16 is a flowchart illustrating a distribution curve generating process according to a modification of the second embodiment.

It is noted that the process of S11 may be executed after the process of S32 as shown in FIG. 16. In such a case, the process of S32 is performed without producing the density curve of FIG. 15(A). The horizontal length of the longest leveled areas is determined in S32 by merely relating the 52 density data inputted in S9 in correspondence with the 52 color signals inputted in S1. For example, the horizontal length of the longest leveled areas is determined in S32 by plotting the 52 density data (vertical axis) relative to the 52 color signals (horizontal axis) as shown in FIG. 8(A). It is possible to determine the horizontal length without interpolating the 52 density data to generate the density curve of FIG. 15(A). One of the first distribution curves (1) and (2) that has resulted in the smaller horizontal length is selected in S32. Then, in S11, the second distribution curve is produced based on; the selected first distribution curve, the density data obtained in S9, and the color signals inputted in S1.

In the second embodiment, both of the second distribution curves (1)' and (2)' are produced, and one of the second distribution curves (1)' and (2)' is selected. However, in the present modification, because the process of S11 is executed only after the selection process of S32, only one second distribution curve (1)' or (2)' is generated for the selected one first distribution curve (1) or (2).

Third Embodiment

Next, a third embodiment of the present invention will be described with reference to FIG. 17 to FIG. 18.

Figure 17:
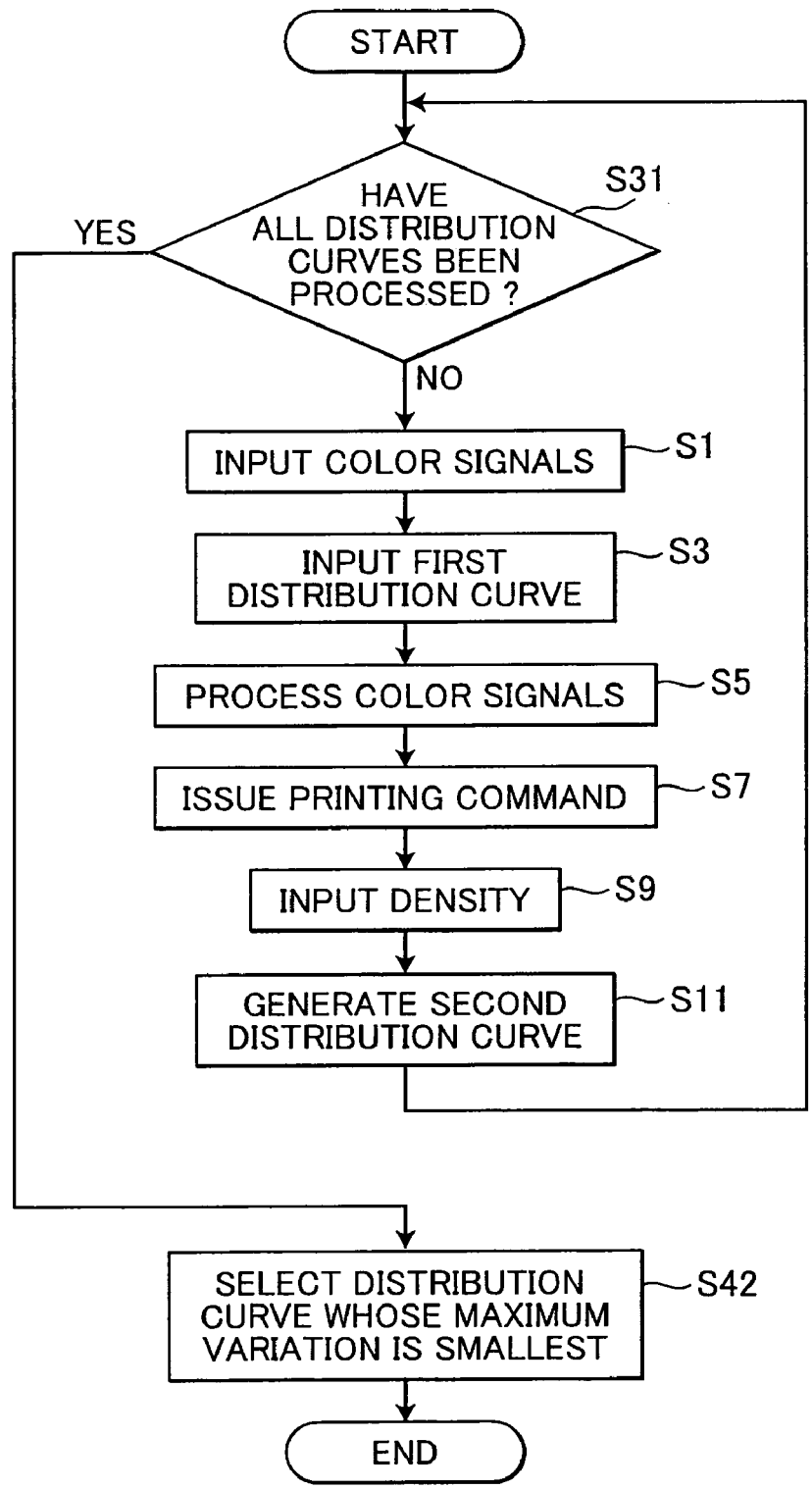
FIG. 17 is a flowchart illustrating a distribution curve generating process according to a third embodiment.

As shown in FIG. 17, the distribution curve generating process of the present embodiment is the same as that of the second embodiment (FIG. 14) except that step S42 is executed in place of S32.

Figure 18:
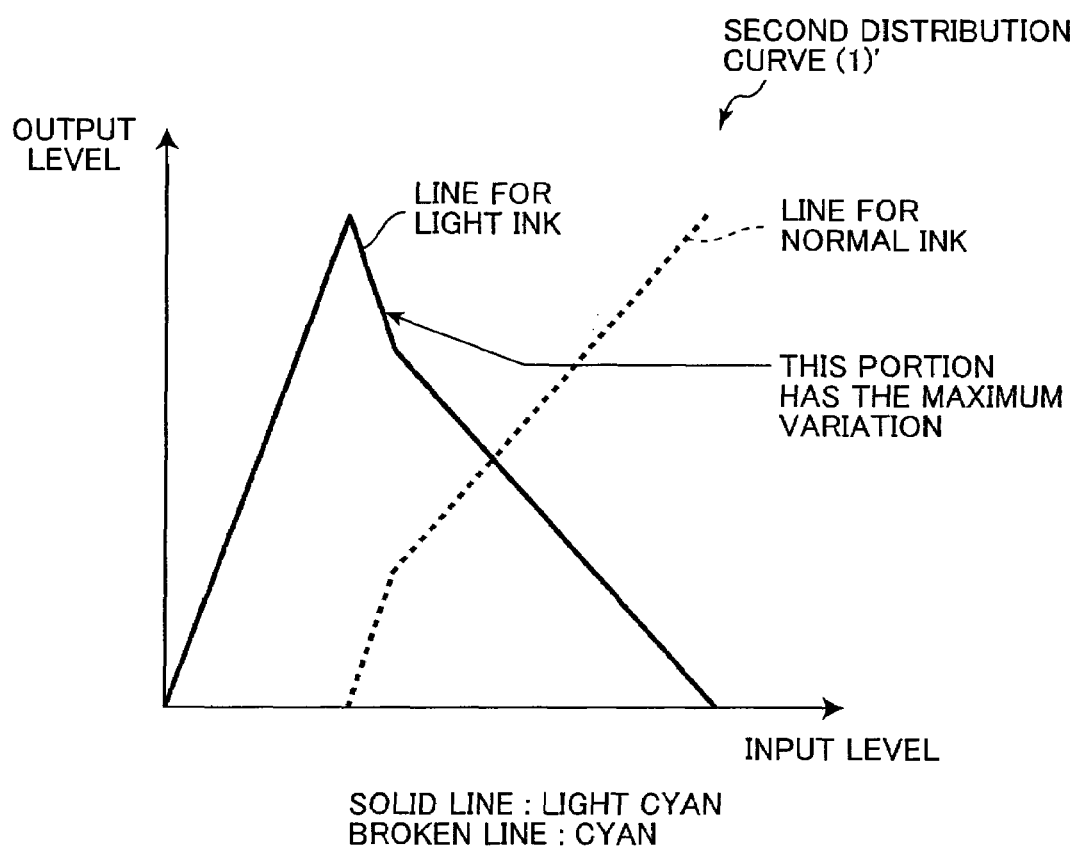
FIG. 18 is a graph showing the maximum variation in a second distribution curve produced during the process of FIG. 17.

It is assumed that a second distribution curve (1)' is generated as shown in FIG. 18 for the first distribution curve (1) during the process S11. It is also assumed that another second distribution curve (2)' (not shown) similar to that of FIG. 18 is generated for the first distribution curve (2).

In S42, one of the second distribution curves (1)' and (2)' is selected in a manner described below.

First, each of the second distribution curves (1)' and (2)' is detected to determine inclination (differential) of the line for light ink and the line for normal ink at each point (original color signal) in the horizontal axis. Then, the value of the maximum inclination (maximum differential) is selected. In this example, the portion indicated by the arrow on the second distribution curve (1)' shown in FIG. 18 is determined to have the maximum inclination. The amount of the maximum inclination is defined as a maximum variation for the second distribution curve (1)'.

The maximum variation of the second density curve (2)' is determined in the same manner as described above.

Then, the maximum variations of the second distribution curves (1)' and (2)' are compared with each other. If the maximum variation of the second distribution curve (1)' is smaller than that for the second distribution curve (2)', the second distribution curve (1)' is selected. On the other hand, if the maximum variation of the second distribution curve (2)' is smaller than that for the second distribution curve (1)', the second distribution curve (2)' is selected. In this way, one of the second distribution curves (1)' and (2)' with its maximum variation being the smallest is selected.

When one of the second distribution curves (1)' and (2)' is selected in S42, the distribution curve generating process of FIG. 17 is ended, and the printing process of FIG. 11 will be executed by using the selected second distribution curve (1)' or (2)'.

Since the second distribution curve with its maximum variation being minimum is selected, it is possible to improve the gradation characteristics of the image and prevent false contours when outputting images on the color printer 2 using this second distribution curve.

While the invention has been described in detail with reference to the specific embodiments thereof, it would be apparent to those skilled in the art that various changes and modifications may be made therein without departing from the spirit of the invention.

For example, in the above-described embodiments, only two first distribution curves (1) and (2) are stored in the ROM 12. However, more than two first distribution curves can be stored in the ROM 12. The more than two first distribution curves may be stored in any other storage device such as the hard disk 14.

In the above-described embodiments, color signals for the color patches (image data) of FIG. 7 and color signals (image data) for desired images are retrieved from the hard disk 14. However, the image data can also be inputted into the personal computer 1 externally via a communication line, such as the Internet.

In the above-described embodiments, the distribution curve generating program is stored in the ROM 12 and executed by the CPU 11 provided in the distribution curve generating device. However, the distribution curve generating program may be stored in any other storage portion such as the hard disk 14. The distribution curve generating program may be stored in various types of storage medium such as a flexible disk, CD-ROM, and loaded into a computer. The distribution curve generating program may be downloaded into a computer via a network such as the Internet.

In the above-described embodiments, color signals C, M, Y, K are color-corrected into the color-corrected color signals C, M, Y, K by the high-order profile before being processed by the first or second distribution curve. However, color signals defined by any other color spaces, such as the RGB color space, the L*a*b* color space or the XYZ color space, may be converted into color-corrected color signals C, M, Y, K by the high-order profile before being processed by the first or second distribution curve. In this case, a well-known ICC profile is used as the high-order profile.

Parameters of the printing conditions are not limited to the maximum ink deposition amount, the recording medium type, the ink type, the resolution, or the printing direction. Any other parameters of the printing conditions may be used for selecting one of the distribution curves.

What is claimed is:

1. A distribution curve generating device for generating a distribution curve for an image forming device, comprising:
    a first distribution curve storing portion that stores a plurality of first distribution curves, each being used for distributing an original color signal of a predetermined color into a color signal for normal ink of the predetermined color and a color signal for light ink of the predetermined color, the light ink having density lighter than the normal ink;
    a color signal inputting portion that inputs a plurality of original color signals indicative of an image;
    a density data detecting portion that processes the original color signals inputted by the color signal inputting portion based on at least one of the plurality of first distribution curves stored by the first distribution curve storing portion and detects the density data of the image that is produced by an image forming device according to the processed original color signals; and
    a second distribution curve generating portion that generates at least one second distribution curve based on: the at least one first distribution curve, the density data detected by the density data detecting portion, and the original color signals inputted by the color signal inputting portion.

2. A distribution curve generating device as claimed in claim 1, further comprising a distribution curve selecting portion that executes either one of a first distribution curve selecting operation to select one of the plurality of first distribution curves stored in the first distribution curve storing portion and a second distribution curve selecting operation to select one of the at least one second distribution curve generated by the second distribution curve generating portion.

3. A distribution curve generating device as claimed in claim 1,
    wherein each first distribution curve determines arrangement of a plurality of color signals for normal ink and a plurality of color signals for light ink relative to the plurality of original color signals whose amount increases gradually, wherein the density data detecting portion processes the original color signals based on the at least one first distribution curve and detects a plurality of density data indicative of densities of a plurality of color patterns that are produced by the image forming device according to the processed original color signals, wherein the second distribution curve generating portion includes:

a density curve generating portion that plots the plurality of density data to generate a density curve indicative of change of the density relative to change of the original color signal amount; an a distribution curve generating portion that rearranges the plurality of color signals for normal ink and the plurality of color signals for light ink relative to the plurality of original color signals, thereby generating the at least one second distribution curve that will generate a corrected density curve indicative of a linear change of the density relative to change of the original color signal amount.

4. A distribution curve generating device as claimed in claim 1, wherein one of the plurality of first distribution curves indicates that the total amount of the normal ink and the light ink increases as the value of the original color signal increases.

5. A distribution curve generating device as claimed in claim 1, wherein one of the plurality of first distribution curves indicates that the color signal of the light ink is zero in correspondence with a maximum value of the original color signal.

6. A distribution curve generating device as claimed in claim 1, wherein the density data detecting portion processes the original color signals based on each of the plurality of first distribution curves and detects the density data of each image that is produced according to the original color signals processed by the corresponding first distribution curve, the second distribution curve generating portion generating a plurality of second distribution curves based on the plurality of first distribution curves using the corresponding density data detected by the density data detecting portion and the original color signals inputted by the color signal inputting portion, further comprising a second distribution curve selecting portion that selects one of the plurality of second distribution curves generated by the second distribution curve generating portion.

7. A distribution curve generating device as claimed in claim 6, wherein the color signal inputting portion inputs the plurality of original color signals whose amount increases gradually, wherein the density data detecting portion processes the original color signals based on each first distribution curve and detects a plurality of density data indicative of densities of a plurality of color patterns that are produced by the image forming device according to the processed original color signals, further comprising a horizontal length calculating portion that plots, for each first distribution curve, the plurality of density data to generate a density curve indicative of change of the density relative to change of the original color signal amount and calculates a horizontal length indicative of a length of the density curve that has approximately the same amounts of density data, wherein the second distribution curve selecting portion includes a selection portion selecting one first distribution curve that has produced the minimum horizontal length among the plurality of first distribution curves and selecting one second distribution curve corresponding to the selected one first distribution curve.

8. A distribution curve generating device as claimed in claim 7, wherein each second distribution curve indicates how the amount of normal ink color signal and the amount of light ink color signal change according to change of the amount of the original color signal, wherein the second distribution curve selecting portion includes:

a maximum variation calculating portion that calculates, for each second distribution curve, variations indicative of inclination of the normal ink color signal amount and the light ink color signal amount relative to the change of the original color signal amount, and selects, for each second distribution curve, a maximum variation indicative of the maximum inclination among the inclination of the normal ink color signal amount and the light ink color signal amount; an a selection portion that selects one second distribution curve whose maximum inclination is the minimum among the plurality of second distribution curves.

9. A distribution curve generating device as claimed in claim 1, wherein the color signal inputting portion inputs the plurality of original color signals whose amount increases gradually, wherein the density data detecting portion processes the original color signals based on each first distribution curve and detects a plurality of density data indicative of densities of a plurality of color patterns that are produced by the image forming device according to the processed original color signals, further comprising:

a horizontal length calculating portion that plots, for each first distribution curve, the plurality of density data and calculating a horizontal length indicative of a length that has approximately the same amounts of density data; and a first distribution curve selecting portion that selects one first distribution curve that has produced the minimum horizontal length among the plurality of first distribution curves and produces one second distribution curve based on the selected one first distribution curve, the detected density data, and the inputted original color signals.

10. A distribution curve generating device as claimed in claim 1, further comprising a first distribution curve selecting portion that selects one of the plurality of first distribution curves stored by the first distribution curve storing portion, the density data detecting portion processing the original color signals based on the selected first distribution curve and detecting the density data of the image produced according to the processed original color signals, the second distribution curve generating portion generating one second distribution curve based on the selected first distribution curve using the density data detected by the density data detecting portion and the original color signals inputted by the color signal inputting portion.

11. A distribution curve generating device as claimed in claim 10,
   wherein the first distribution curve storing portion stores a plurality of first distribution curves in correspondence with a plurality of different printing conditions of the image forming device, and
   wherein the second distribution curve generating portion selects the one first distribution curve according to one printing condition to be set in the image forming device.

12. A distribution curve generating device as claimed in claim 11, wherein the plurality of different printing conditions are defined according to at least one of several parameters including a maximum ink deposition amount, a recording medium type, an ink type, a resolution, and a printing direction.

13. A distribution curve generating device as claimed in claim 10,
   wherein the first distribution curve storing portion stores a plurality of first distribution curves in correspondence with a plurality of different ink deposition amounts, and
   wherein the second distribution curve generating portion selects the one first distribution curve according to a maximum ink deposition amount of a recording medium used in the image forming device.

14. A computer readable medium storing a set of program instructions to be executed by a computer to generate a distribution curve for an image forming device, the computer including a first distribution curve storing portion storing a plurality of first distribution curves, each being used for distributing an original color signal of a predetermined color into a color signal for normal ink of the predetermined color and a color signal for light ink of the predetermined color, the light ink having density lighter than the normal ink, the program instructions comprising:
   color signal inputting instructions for inputting a plurality of original color signals indicative of an image;
   density data detecting instructions for processing the original color signals inputted by the color signal inputting portion based on at least one of the plurality of first distribution curves stored by the first distribution curve storing portion and detecting the density data of the image that is produced by an image forming device according to the processed original color signals; and
   second distribution curve generating instructions for generating at least one second distribution curve based on: the at least one first distribution curve, the density data detected by the density data detecting program, and the original color signals inputted by the color signal inputting instructions.

* * * * *